United States Patent [19]

Entressangle et al.

[11] Patent Number: 5,706,475
[45] Date of Patent: Jan. 6, 1998

[54] INFORMATION PROCESSING SYSTEM FOR CONSULTING CENTRALIZED INFORMATION ORIGINATING IN OPERATIONAL APPLICATIONS

[75] Inventors: Gabriel Entressangle, Brie et Argonnes; Claude Paoli, Villard Bonnot; Jean Dalle Rive, Meylan, all of France

[73] Assignee: Bull, S.A., Louveciennes, France

[21] Appl. No.: 460,810

[22] Filed: Jun. 2, 1995

[30] Foreign Application Priority Data

Jun. 2, 1994 [FR] France .................................. 94 06738

[51] Int. Cl.⁶ .................................................. G06F 15/40
[52] U.S. Cl. .............................................. 395/500; 395/601
[58] Field of Search .................................. 395/900, 601, 395/602, 603, 611, 613, 614, 615

[56] References Cited

U.S. PATENT DOCUMENTS

| | | | |
|---|---|---|---|
| 4,774,661 | 9/1988 | Kumpati | 395/601 |
| 5,555,403 | 9/1996 | Cambot et al. | 395/600 |
| 5,555,409 | 9/1996 | Leenstra, Sr. et al. | 395/600 |

FOREIGN PATENT DOCUMENTS 0425222  2/1991  European Pat. Off. .

OTHER PUBLICATIONS

Computer Communications., vol. 15, No. 4, May 1992, Londres GB pp. 270–278; M. Kamel & N. Kamel: "Federted database management system: Requirements, issues and solutions" *entire document*.

9th International Conference on Computers and Communications, 21 Mar. 1990, Scottsdale, USA pp. 706–713 C. Batini et al: "A methodology for the design of data dictionaries".

Primary Examiner—Kevin J. Teska
Assistant Examiner—A. Roberts
Attorney, Agent, or Firm—Kerkham, Stowell, Kondracki & Clarke, P.C.; Edward J. Kondracki

[57] ABSTRACT

An information processing system for consulting centralized information originating in operational applications including a server and a plurality of microcomputers that issue requests to the server. The server includes data stored in the form of files and a metadictionary developed around a plurality of tables specific to the documentation and the administration of the system. Notably, the data is organized in domains, subdomains and functions, and are analyzed by a logical process contained in the metadictionary, which includes axes and indicators that describe the applications. The logical process makes it possible, at the moment the data to be imported into the server is defined, to create tables that contain the data of complementary tables, called consolidation tables, to authorize a generic response to all the requests made of the data and to optimize access performance.

6 Claims, 1 Drawing Sheet

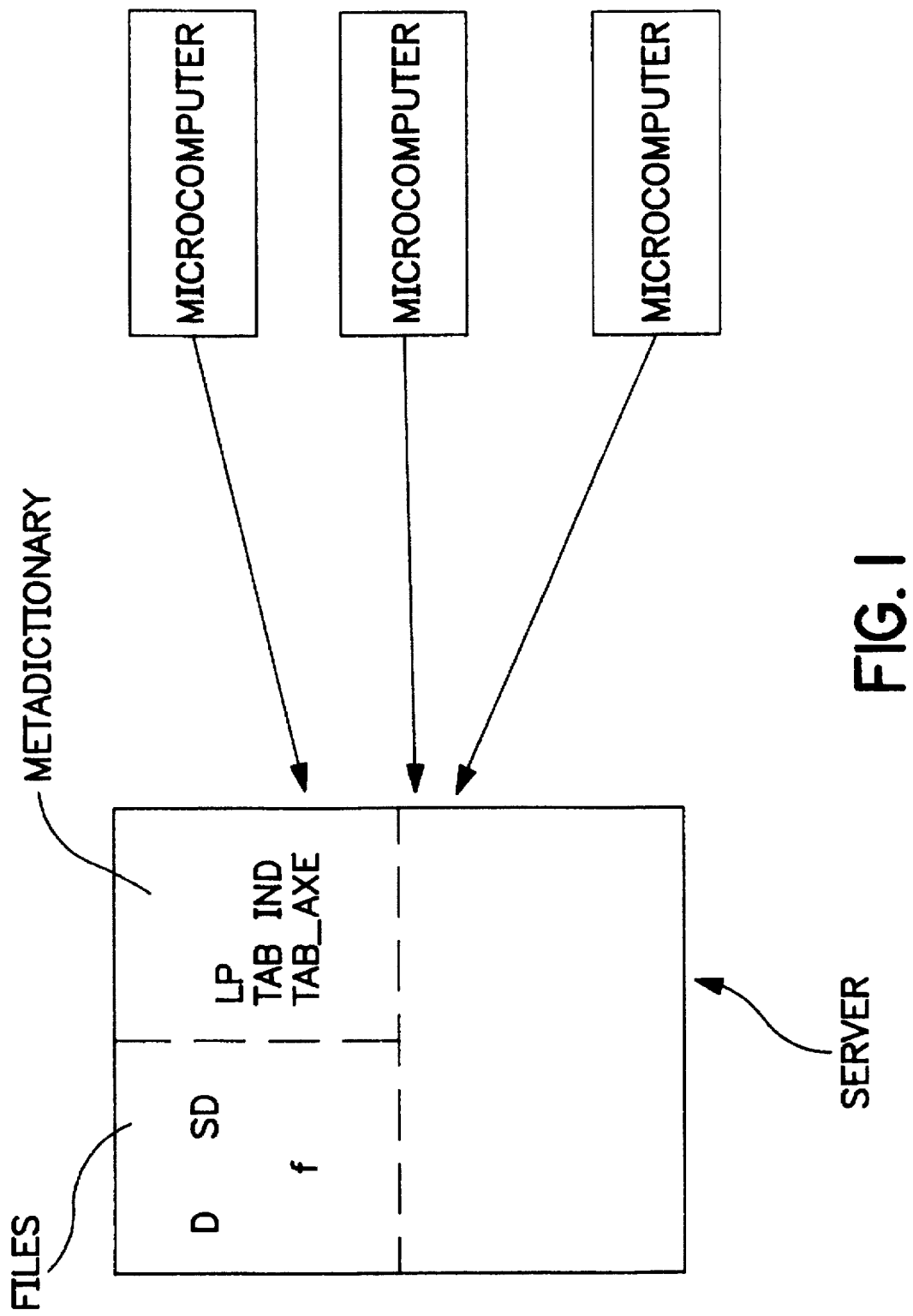

INFORMATION PROCESSING SYSTEM FOR CONSULTING CENTRALIZED INFORMATION ORIGINATING IN OPERATIONAL APPLICATIONS

BACKGROUND OF THE INVENTION

The present invention relates to a information processing system for consulting centralized information originating in operational applications, composed of a server and a plurality of microcomputers that issue requests to the server, which on the one hand includes data stored in the form of files and on the other includes a metadictionary developed around a plurality of tables specific to the documentation and the administration of the system.

In general, in the same business, there may be several operational applications located at different sites and on different systems. To enable consulting of centralized information originating from these operational applications, an information processing system must be used. Such a system typically includes at least two fundamental elements: a server, also called a data base, and one or more microcomputers that issue requests to the server; for consultation by the user, each microcomputer has a graphical interface, also called a graphical front-end processor. The server or data base can be defined as an integrated set of data that models a predetermined universe, and to avoid problems of duplication, the data used by the various applications are accordingly combined in the same server. Such a server or data base contains objects from the real world, and associations among these objects. For the sake of simplicity of data representation, and to enable greater productivity on the part of developers and users, the relational data model is used, because it enables the representation of both objects and associations between objects. In this case, a relational data base is in the form of a set of relations—hence the name of the model; these relations are also called tables. In addition to simplifying and improving performance, the standardization of the language SQL, which is easy to use, has contributed to the proliferation of relational data bases. The server is generally divided into two parts: the data and the metadictionary, also called a metabase or a data dictionary. The data part is stored physically in the data base in the form of files. The metadictionary part, developed around a plurality of tables specific to the documentation and administration of the system, dynamically describes the data base, and its contents reflect an image of the data base at any moment. The metadictionary thus makes it possible, in particular, to describe the objects of data bases, the users of the system, and the privileges and rights of the users to the various objects. Hence the contents of the metadictionary constitute a set of information that evolves as the data base is used. Accordingly any operation that affects the structure of the data base automatically causes updating of the metadictionary. This kind of description of the set of objects managed in the metadictionary enables an integrated manipulation, using the same language, typically SQL, of both the data and their structures.

However, this kind of information processing system has various disadvantages. In effect, the data dictionary is built directly on the structure of the tables and hence is deduced from the tables, and thus does not enable creating abstractions, or in other words, links with the user profile. The interface user must also know both the data structure and the SQL language. Finally, in this context, the period of time for integrating an application, between the definition of the file of tasks and the possibility of using the data base in this application, is generally excessively long.

SUMMARY OF THE INVENTION

A primary object of the present invention is to overcome the aforementioned disadvantages and to provide an information processing system that enables rapid integration of applications, enables a structured analysis of the data, and offers the user great ease and great convenience of use.

DESCRIPTION OF THE DRAWING

Other objects, advantages and aspects of the subject invention will become apparent from a study of the following specification when viewed in light of the accompanying drawing, in which:

FIG. 1 shows a block diagram of the major components of the information processing system of the present invention.

DESCRIPTION OF THE PREFERRED EMBODIMENTS

To accomplish this, the information processing system for consulting centralized information originating in operational applications, as described above, is notable in that the data is organized in domains, subdomains and functions, and are analyzed by a logical process contained in the metadictionary, which is embodied by means of axes and indicators that describe the applications. The logical process makes it possible, at the moment the data to be imported into the server is defined, to create tables that contain the data of complementary tables, called consolidation tables, to authorize a generic response to all the requests made of the data and to optimize access performance.

Advantageously, and against all expectations, in an application concerning a relational data base, it has been possible to physically embody the concept of domains, subdomains, axes and indicators ordinarily used in specifications written on paper, by way of the metadictionary, in the form of a generic interface corresponding to the present invention.

Hence according to the instant invention, the data organized into domains, subdomains and functions are loaded into the data base, in which the user, from his interrogation station, has a functional view through a metadictionary, which describes the applications and enables consolidation in terms of axes and indicators, and which has a highly generic nature. The access for consultation is gained through domains and subdomains that make it possible to guide the user to the level corresponding to the data desired. The axes enable analysis of the quantities, by predetermined criteria, and the indicators are the measurable values that the user is interested in. The selection of axes and indicators enables the automatic composition of requests, which in this case are called personal requests, requests that can be catalogued and recalled at any moment, as well as common requests that are offered upon origin to the user. The concept of axes and indicators makes it possible in a simple way to construct requests that best translate the desired questions asked. This dynamic system is capable, as a function of the user's choice and thanks to the metadictionary to be retrieved, of directly addressing the optimal consolidation table. Unlike the prior art, it is the metadictionary that configures and directs the behavior of the data base and of the user of this data base. The consolidation tables are deduced and created from the metadictionary. It is easy to describe an application, and when one wishes to integrate a new application, the new application is connected to predetermined domains and subdomains; it then suffices to describe it in terms of axes, indicators and levels of preconsolidation, so that it will automatically be acknowledged by the system. The tables corresponding to the application are in fact constructed, and the server (or base) is enriched with these tables thanks to the metadictionary, by defining the axes and the indicators. The metadictionary is a motor for the configuration of the server and for optimizing requests, and it offers a multidimensional character. The application is then viewed, through the graphical interface, in all its dimensions. Moreover, it is presented at a high level of "security", because the user views his access rights administered in a very strict manner, up to the level of the value of an indicator. Finally, besides the highly generic nature which is quite favorable to the user, it is apparent that the user need not know the data structure and the SQL language to use the graphical interface. The requests are easier to formulate, and the access performance is optimized significantly.

In this information processing system, notably, an axis corresponds to one analysis dimension for a function, each axis being divided into levels that make it possible to obtain a desired information size, while an indicator is the measure of the information size defined after the axes and levels have been chosen, the chosen indicator then being analyzed along the predefined axes and its contents representing the measure of the information required.

Similarly and characteristically, the metadictionary includes the tables specific to each application, general information about the management of the domains and subdomains and the management of the axes and indicators, the information linked with the loading and transfer of applications, and the elements necessary for automatic construction of consultation requests, the management of the users, and the rights of the users.

Also, and advantageously, the information processing system includes, on each microcomputer, a unique graphical interface for interrogation by the user, which is adapted automatically to any type of data viewed through the metadictionary and hence to the function chosen, by presenting the axes and indicator or indicators that are accessible. The metadictionary assures the interface between a request expressed in terms of domains, subdomains, axes, levels and indicators, and the set of data contained in the server.

Thus because of the invention, each user can access the information necessary for command purposes in his field of activities. The data is reliable because it is extracted directly from the systems in operation, and any application can easily be integrated into such a system. For convenience of use, management reports (made for instance using Excel, a registered trademark of Microsoft Corporation) are automatically created from the system data to facilitate access to and use of the system by the user. The user thus has access to all the functionalities present in the system from the same presentation screens. The user in constantly guided, since all the selections and commands are made via the graphical interface, and at every moment he has global, contextual help available on line. The graphical interface can be likened to an intelligent graphical front-end processor for the various applications managed by different data bases.

Advantageously, due to the power of the representation in axes and indicators, and the hierarchical axis structure in levels, the information processing system according to the invention is notable in that it enables dynamic construction of a minimal common axis by uniting at least two axes, after comparison and detection of equivalence of levels of the at least two axes, thus authorizing transverse interrogations across different domains for analyzing different indicators with respect to the different axes common to the different indicators chosen, which in turn belong to the different domains.

This introduces a notion of transversality and axis translation, which makes it possible to put together different indicators specific to different applications, and hence to put together information originating in different applications, based on the construction of a minimal common axis deduced from various identical axes. When the equivalent levels are encountered on these axes, or in other words as long as the structure does not change, it is then possible to automatically manage a transversal application. A single request is then necessary to obtain the information desired that is specific to different applications, and this does not require intimate knowledge of these applications, while in the prior art a number of requests equivalent to the number of given applications was necessary. For the user, it is therefore not necessary to have intimate knowledge of these applications; once the common axis has been constructed and displayed, it suffices to look at the indicators.

Preferably, the process of integrating an operational application into an information processing system according to the invention can be broken down into the following steps:

identification of the system in operation or of the operational data base upstream, with acknowledgement of the administrator and of the rights of the users;

identification of the needs and of the type of requests of the users of the system in operation;

determination of the domains, subdomains, axes (each axis level representing the size of the information one wishes to analyze), indicators (measure of the size), and rules of consolidation;

preparation of the server
    receiving tables of the addressees of the upstream data of the system in operation;
    enrichment of the metadictionary relative to the user profile (access rights) and to the definition of the axes and indicators;
    construction of consolidation tables by the rules of consolidation.

The ensuing description, given by way of non-limiting example, will enable a better understanding of how the invention can be used.

The information processing system has the object of offering a global vision of the various parameters that are indispensible if a plurality of operational applications are to be managed efficiently. These essential parameters are indicators that can be analyzed along multilevel axes and that are classified into functional subdomains that in turn are combined into domains.

No user can access all the indicators or all the levels of the axes. Each user authorized for access has a certain profile, which determines the indicators that are visible and the axes or portions of axes that will be analyzed.

Access to the server supporting the data and the processing is possible from "client" microcomputers of the PC type into which applications software has been loaded. The microcomputers must be connected to a network, which constitutes the physical link for access to the server. The world in which the information processing system is used is constituted by a set of homogeneous objects organized into classes and capable of offering transversal views along common axes.

The data which enables the construction of the indicators is supported by dedicated applications, which in turn are managed by users who have knowledge of these applications. In general, these various applications are heterogeneous (data, format, system, platform, etc.) and consequently cannot, in a simple and general manner, be consolidated and juxtaposed with one another. In fact, the world of operational applications is populated with high-performance applications, each in its own domain but not cooperating with one another. Each of them nevertheless constitutes the reference for the data that it is intended to support.

From the above statements it is clear that it is the world of operational applications from which the indicators and the axes are to be extracted, and once loaded into the world of the information processing system, make it possible to have a global, homogeneous vision of the various parameters exported through the indicators.

Hence these two worlds are closely linked, and it is clear that the reference world constituted by the operational applications must transmit all the modifications that have occurred to the presentation world which is constituted by the information system, and they must do so by the most automatic and general possible protocol.

In a more detailed fashion, the kinds of processing done inside the information processing system can be classified in accordance with a certain number of phases.

A first phase consists of extracting the indicators and the axes. The host machine that supports the operational application constitutes the link with the processing, and the data of the data base that supports this application is the input data. The processing consists of presenting the operational data retained by the information processing system in the form of indicators and axes. This essentially involves processes of aggregation and consolidation, and sometimes more complex processing when indicators calculated from other data of the data base are involved. A plurality of levels are presented, depending on the case: obligatory levels for extracting and fabricating "primary" indicators and the associated axes, in the form of a specified file, with the level of consolidation directly accessible under the operational application; optional levels on the one hand for preconsolidation of the indicators depending on the minimum level required by the information processing system, if that level is higher than that of the application, and on the other hand for calculating indicators derived from the "primary" indicators, and the presentation in standard form in a resulting file. The output data is stored in a text file in a format that is specific to the information processing system and is common to all the applications involved in the information processing system.

A second phase includes transferring the resulting file to the receiving machine of the information processing system (which is actually the server), whose input data originate in a text file specific to the indicators and axes of the host machine. The processing is done by the hosting machine, which as a function of a calendar specific to each application takes the initiative in repatriating the file, on the condition that the file is available and is determined to be valid. This transfer is automatic, but the information processing system administrator must be capable of having a manual procedure available for particular cases. The output data is stored in a text file relating to the indicators and axes on the hosting machine.

A third phase includes verifying the resulting file in the hosting machine of the information processing system. The input data are in the hosting machine in the text file specific to the indicators and axes and they contain the verification criteria in the data base or metadictionary; the processing then includes verifying the incoming data. The output data includes the thus-verified file, the report of this verification, the journal of the rejects, and the updating of the metadictionary.

The fourth phase relates to loading information into the server. The input data is in the text file specific to the indicators and axes, and it relates to the tables in their final state. The axes and the consolidation table are loaded, and the external identifiers are translated into internal identifiers. The output data involve the updated tables, the report of the loading, the journal of the rejects, and the updating of the metadictionary.

The fifth phase consists of the "historization" (arrangement and updating of information) in the server. The loaded data base tables, and the historization parameters in the metadictionary, form the input data. When the information is processed, the least recent information is compressed, while the expired information is stored in an archive or deleted. The output data includes the historized table, the report of historization, the journal of anomalies, deletions, and recording, and the updating of the metadictionary.

The sixth phase relates to the calculations and preconsolidations in the server. The historized data base and the calculation and/or preconsolidation parameters constitute the input data, while the processing in this phase relates to calculating the secondary indicators and to multilevel consolidations. The output data includes the base table supplemented with the calculated indicators, the preconsolidation tables, updating of the metadictionary, the report of consolidation, and the journal of anomalies.

The seventh phase relates to the connection to the information processing system, which consequently means the connection of different microcomputers (clients) to the server. The name and the password of the user, the table of users and the rights these users have, and the metadictionary, which all form the input data. The processing consists of searching for the name and verifying the password of the user, and selecting the indicators and the user profile. The output data relate to the report of the connection, the list of authorized indicators, the user profile, and recording in the "log book" file.

The eighth and final phase is specific to the fabrication of the request for interrogation by a microcomputer to the server. The input data is made up of the list of indicators and levels on the axes and by the metadictionary, and the processing consists of searching for the identifiers specific to the axes and the indicators, and searching for the optimal consolidation table. The output data relates to the name of the optimal consolidation table.

The present invention makes it possible to meet the expectations of developers and users, presenting and making use of the following principles:

because of the highly generic nature, any development can be reused or parametrized and made completely independent of the operational source application, once the parameters are loaded;

the indicators and axes can be constructed as far upstream as possible;

indicators and axes can be furnished from input files constructed on the same outline and "self-described";

the information processing system is provided such that it enables searching for the information at the central site while on the one hand preserving performance and on the other avoiding any change in the "client" part at a microcomputer.

A general data architecture that enables classification of these data is presently proposed. Thus the data manipulated by the information processing system can be distributed under three classes:

security-related data that authorize control of the access to the data specific to the application;

the metadictionary, containing the description of the data manipulated and the links between them, the metadictionary being the basis of the mechanism having the generic nature;

application-specific data, which support indicators and axes. With attention to efficiency and coherence, a methodology is also employed by which the following rules, relating to the data and the processing operations, are preferably obeyed:

the names of the tables and fields must be as explicit as possible while being kept to a reasonable length;

juxtaposed names used for a designation must be separated by an underlining character (called "underscore" by one skilled in the art);

the names of attributes that designate the same property for various entities must be identical;

any entity of the metadictionary must possess a unique internal identifier of numerical type, in order to make the junctions faster (putting together of data found in different tables), with all the identifiers beginning with the same sequence of characters.

The server includes, on the one hand, the data base that support the information that is to be analyzed, and on the other, the metadictionary.

The data base is divided into two categories:

the axes, which are hierarchical objects that represent the points of view from which it is desired that the indicators be analyzed;

the consolidation tables, which support the values of one or more indicators along one or more axes.

An operational application is described for the information processing system in terms of axes, and in general a consolidation table of indicators along these axes. In the information processing system, it is possible in the loading phase to generate other consolidation tables from the data base for higher levels of certain axes, which makes it possible to improve the consultation performance.

To facilitate the process of searching for the proper consolidation table, the nomenclature of the consolidation tables is as follows:

a "root" part identifying the original application;

a "suffix" part composed of an underlined character ("underscore") and a reference number for the consolidation level, where the base table that includes the highest levels has "_0", and for the other tables the suffix number is incremented as a function of the consolidation level.

As to the table format, for each operational application there are the following:

One table per axis: T_AXE . . .

IDLEV: identifier of the axis level element

NAME: designation of the axis level element

LEVEL hierarchical level

ILEVDH identifier of the connection element

FLAGV validity of the level n Consolidation tables ROOT_X:

VALIND1: indicator value 1

VALIND2 indicator value 2

IDLEV_AXE1: identifier of the level element for axis 1

IDLEV_AXE2: identifier of the level element for axis 2

The metadictionary itself, in the tables, contains the description of the base data and also contains the mechanisms that make the generic nature of the application. The following are found in the metadictionary:

The table of the operational applications TAB_APPLIS:

IDAPPLI: identifier of the application

NAME: name of the application

IDSUBDOMAIN: identifier of the connection subdomain

HOST: machine that supports the application (IP name)

FILE_INPUT: name of input file in the host system

FILE_LOAD: name of input file in the loading/consolidation system

CALENDAR: data recovery calendar

IDADMIN: identifier of the administrator for the information processing system

IDLOAD_V: identifier for valid loading into the metadictionary

IDTR_V: identifier of valid transfer to the metadictionary

FLAGV: validity flag

The transfer management table TAB_TRANS:

IDTR: identifier of the transfer

IDAPPLI: identifier of the application

DATE_TR: date transfer executed

VER_TR: version of the transfer (in the case of several attempts)

STATUS: status of the transfer (impossible, in progress, OK, not OK, etc.)

CR_TR: summary report of the transfer

FILE_CR: name of the report file

The load operation management table:

IDLOAD: identifier of the load operation

IDAPPLI: identifier of the application

DATE_LOAD: date load operation executed

VER_LOAD: version of the load operation (in the case of several attempts)

DATE_DATA: date data loaded

VER_DATA: version of the data loaded

STATUS: status of the load operation (impossible, in progress, OK, not OK, etc.)

CR_LOAD: summary report of the load operation

FILE_CR: name of the report file

The table of indicator descriptions TABIND

IDIND: identifier of the indicator

CODIND: code of the identifier for the application

NAME: name of the indicator

IDAPPLI: identifier of the connection application

UNITE: unity

TYP_DATA: data type (alphabetical, numerical, date, etc.)

FORMAT: format of the datum (as a function of the type)

SEUIL_H: upper threshold value

SEUIL_B: lower threshold value

TYPIND: indicator type (primary, calculated, transverse)

TYP_CUMUL: function to be used for the consolidation

TAB-RACINE: root of the name of the table containing the datum

CHAMP: name of the field in the support table containing the value

TYP_HISTO: type of "historization"

FLAGV: validity flag

The table of consolidated tables TAB_CONSO:

IDIND: identifier of the indicator

IDAXE: identifier of the axis

LEV_MIN: minimum accessible level of the axis

SUFF: consolidation suffix to be used

The table of indicator/axis links IND_AXE:

IDIND: identifier of the indicator
IDAXE: identifier of the axis
FLAGV: validity flag
*This table can be a view of the first two columns of the above.
The table of axes TAB_AXE:
IDAXE: identifier of the axis
NAME: name of the axis
NB_NIV: number of levels
TAB_NAME: name of the support table
FLAGV: validity flag
TYPE_AXE: type of axis (direct/translated)
FLAGV: validity flag
The table of axis translation tables:
IDAXE_ORG: identifier of the source axis
IDAXE_DEST: identifier of the destination axis
TAB_TR: translation table
FLAGV: validity flag
The translation tables TR_XXX_YYY:
IDLEV_ORG: identifier of the source level item
IDLEV_DEST: identifier of the destination level item The data relating to security are stored in the following different tables:
The table of authorized users: WHOSWHO, including the following fields:
LAST NAME, FIRST NAME: upper-case characters
IDPERS: user ID
IDORG: connection organization item ID
TEL: telephone
MAIL: messaging
KEY: encrypted password (length a function of the encryption "process")
DATEKEY: date key loaded
EDA_HOST: name of data server
EDA_LOGIN: login for access to EDA server
EDA-PASSWD: password for access to EDA server
EDA PROFILE: EDA connection profile of user
IDMETIER: connection mode ID
FLAGV: validity flag for entering the table (1=valid; 0=expired)
The table of domains DOMAIN:
IDDOMAIN: domain ID
NAME: name of domain
FLAGV: validity flag for entering the table (1=valid; 0=expired)
The table of subdomains or functions SUBDOMAIN:
IDSUBDOMAIN: subdomain ID
NAME: name of subdomain
IDDOMAIN: connection domain ID
FLAGV: validity flag for entering the table (1=valid; 0=expired)
The table of accessible user/indicators: IND_USER:
IDIND: indicator ID
IDPERS: user ID
The table of authorized user/axes: AXE_USER:
IDPERS: user ID
IDAXE: axis ID
LEVMAX: maximum authorized level of the axis
IDLISTAUT: ID of the list of authorized values at the maximum level The table LISTAUT containing the authorization lists at the axis levels:
IDLISTAUT: ID of the list of values authorized at the maximum level
IDLEVAXE: ID of the authorized level Various processing operations need to use the data described above. Thus the transfer processing operation, which takes place at the boundary of the world of operational applications and the world of the information processing system and whose basic object is the operational application:

daily scrutiny of the applications table to determine, from the CALENDAR information, the applications for which the transfer must be initiated;

transfer of the file FILE-INPUT from the machine HOST to FILE_LOAD with management of the STATUS, and reports CR_TR and FILE_TR, DATE_TR and VER_TR, during the process of transfer, consultation solely by the dedicated administrator IDADMIN, placement of the successful IDTR in IDTR_V in TAB_APPLIS.

The same is true for the load processing operation, where "load" is understood to mean all the operations to be performed, from the transferred input file to the operational application, in order to obtain the data in accordance with the defined architecture for the information processing system, in which the two following steps can be distinguished:

analysis of the transferred file header; creation of IDLOAD in TAB_LOAD with updating of DATE_LOAD, VER_LOAD, DATE_DATA, VER_DATA.

reading of the current description of the application in the metadictionary in terms of indicators and axes from TAB-IND and TAB_AXE (IDAPPLI junction). Verification with the data of the incoming file.

As has been described above, this information processing system allows centralized information originating in operational applications to be consulted. However, it also authorizes access to specialized applications that are supplied from operational applications. It is on the basis of the data contained in the files of host applications that make it possible to supply the indicators and the axes and to enable standardized consultation of information and to put together certain information originating from various applications.

Preferably, for each application, the information is contained in a single physical file, called the input file. This file is composed of a file header and the chaining together of a plurality of blocks, separated by a line that begins with a predetermined character, such as "---". The header lines all begin with the character "*". Each block includes one part reserved for a block header listing information contained in the block and having possible comments. The remainder of the block contains the records of data in the form indicated at the file header. A block can contain only a single type of record. Moreover, provision is made in the information processing system for at least one block per indicator, and in general one block per axis.

The input file will for example have the following general structure:

*file header
---
*block header
record1
---
. . .
record n
---

```
...
---
*block header
record1
...
record n
---
```

The information contained in a file header has the purpose of enabling general presentation of the file. This information involves the following, for example:

the format of the file (record-type file of fixed format, or record-type file of variable size with separator), the separator character, the type of file (data, or handling of anomalies), the person or service to be contacted in the case of problems, the type of machine or system of origin, the period of validity of the data.

A certain number of key words and parameters are used, such

FIXED: Record-type file of fixed format without separator.

VARIABLE: [(delimiters)]: Record-type file of variable size with separator. By default, the separator character will be the semicolon. Otherwise, the character will be specified in the "delimiters" variable.

DATA: Data file.

REVISION: Correction of a preceding file.

DATE: Date of file creation, in the format DD-MM-YYYY.

TRANSFER: date of file transfer, in the format DD-MM-YYYY. This is the date of transfer linked with the fiscal calendar.

VALID (spec_application): Determination of the period of validity of the file.

FROM (string):
various information
Person or service to be contacted in the case of problems
type of machine or system of origin
period of validity of the data COMMENT string:

Free commentary, limited to a certain number of characters and ending in ".". This comment corresponds to the message that will be posted when the user gains access to the data of the current application.

The data contained in the blocks that are furnished by the source applications are made up of several types of information: the generic information on the loading operation, the descriptions of the axes, and the descriptors of the indicators per axis.

The descriptions of the axes and of the indicators are done in the blocks. Two types of blocks are consequently used: the blocks that describe the axes, and the blocks that describe the indicators. In addition, the data files that are communicated to the information processing system must give both the value of the information and the links that connect various items of information with one another. In fact, when a user looks for an item of information, he can do so as a function of one or more levels of one axis, and as a function of a plurality of axes. To do so, for each level of an axis, there must be an identifier that uniquely defines the occurrence of this level; this identifier, or ID, cannot be modified during the entire lifetime of the occurrence in the source application. Furthermore, the data furnished are as close as possible to the data contained in the metadictionary, to facilitate consolidation.

For better understanding of the invention, an example of a simple application is discussed below. In this example, the application relates to connections by road for buses between towns in several départements, and the fares for these connections. Analyzing the needs shows two indicators, which are the timetables and the fares, and three axes, which are the origin axis, the destination axis, and the company axis. The origin axis may for instance be broken down into two levels, the départements level and the town level; the destination axis can also be broken down into two identical levels, the départements level and the town level, and finally the company axis has only a single level, which is the name of the company.

Specifically, in this exemplary application, the input file will be in the following form:

Description block of the "company" axis
<num-company>:<name_company>
Description block of the "origin" axis
<code_postal_origin>:<département_origin>:<num_town_origin>:<name_town_origin>
Description block of the "destination" axis
<code_postal_destination>:<département_destination>:<num_town_destination>:<name_town_destination>
Description block of the "fare" indicator
<num_company>:<code_postal_origin>:<num_town_origin>:: <code_postal_destination>:<num_town_destination>:<fare>
Description block of the "timetable" indicator
<num_company>:<code_postal_origin>:<num_town_origin>:: <code_postal_destination>:<num_town_destination>:<timetable>

The data file in this exemplary application could then be as follows:

```
* VARIABLE (:) DATA
* DATE 31-12-1992
* TRANSFER 01-01-1993
* VALID (01-12-92/30-09-1992)
* FROM (Mr DUPONT Phone 227-7777)
* COMMENT a new connection exists: Grenoble→Seyssinet;
*<num_company>:<name_company>
1:Compagnie du sud-ouest
2:VFD Voie ferrée du Dauphinée
3:Compagnie du Vercors
---
*<code_postal_origin>:<département_origin>:<num_town_origin>:<name_town_origin>
38:Isère:1:Grenoble
38:Isère:2:La mure
04:Alpes de Haute Provence:3:Sisteron
05:Hautes Alpes:4:Gap
---
<code_postal_destination>:<département_destination>:
<num_town_destination>:<name_town_destination>
38:Isère:1:Grenoble
38:Isere:2:La mure
04:Alpes de Haute Provence:3:Sisteron
05:Hautes Alpes:4:Gap
---
<num_company>:<code_postal_origin>:<num_town_origin>: <code_postal_destination>:<num_town_destination>:<fare>
2:38:1:38:2:28
2:38:2:38:1:28
3:38:2:05:4:21
---
<num_company>:<code_postal_origin>:<num_town_origin>::
```

```
<code_postal_destination>:<num_town_
destination>:<timetable>
2:38:1:38:2:11h10
2:38:2:38:1:12h40
3:38:2:05:4:13h10
2:38:1:38:2:15h30
2:38:2:38:1:16h30
3:38:2:05:4:18h52
---
```

In conclusion, the server of the information processing system constitutes a logic base that includes a plurality of applications combined into domains. Each domain is represented as a set of axes and indicators. Each of the host applications is accordingly translated into axes and indicators and disappears from the consultation level, which thus assures complete independence relative to the application. The metadictionary itself includes the logical definition of each of the determined domains, and the definition of the users and their rights is based on this metadictionary.

We claim:

1. An information processing system for consulting centralized information originating in operational applications, comprising a server (S) and a plurality of microcomputers (MC) adapted to issue requests to the server, said server including data stored in the form of files (F) comprising indicators and axes, which are hierarchical objects classified in different levels that represent desired points of view for analyzing said indicators, one table being associated with each axes and consolidation tables, which support values of one or more indicators along one or more axes, and a metadictionary (MD) including a plurality of tables specific to documentation and administration of the information processing system, wherein said data is organized in domains (D), subdomains (SD) and functions (f), and is analyzed by a logical process (LP) contained in the metadictionary, said metadictionary including axes (A) and indicator (I) tables (TABIND, TAB-AXE) that describe the applications, said logical process being operable, at the moment data to be imported into the server is defined, to create tables that contain data of complementary tables, to authorize a generic response to all requests made of the data in the server and to optimize access performance, and further including means for constructing a minimal common axis dynamically by uniting at least two axes, after comparison and detection of equivalence of levels of the at least two axes, and authorizing transverse interrogations across different domains for analyzing different indicators with respect to the different axes common to different indicators chosen, which in turn belong to different domains.

2. The information processing system of claim 1, wherein an axis corresponds to one analysis dimension for a function, each axis being divided into levels to obtain a desired information size, and said indicator is a measure of the information size defined after the axes and levels have been chosen, and further including means for analyzing a chosen indicator along the predefined axes wherein contents of the indicator represents a measure of information required.

3. The information processing system of claim 2, wherein the metadictionary includes tables specific to each application, general information about management of the domains and subdomains and management of the axes and indicators, information linked with loading and transfer of applications, and elements necessary for automatic construction of consultation requests, management of users, and rights of users.

4. The information processing system of claim 3, wherein each microcomputer includes a unique graphical interface for interrogation by the user, said interface being adapted automatically to any type of data viewed through the metadictionary and hence to a function chosen, by presenting the axes and indicator or indicators that are accessible, the metadictionary being operable to enable interface between a request expressed in terms of domains, subdomains, axes, levels and indicators, and a set of data contained in the server.

5. The information processing system of claim 1, wherein for each application, information is contained in a single physical file including a header and a plurality of blocks chained together, separated by a line that begins with a predetermined character, the header lines all beginning with a second predetermined character, each block including a reserved portion with a block header listing the information contained in the block, a remainder of the block containing records of data in a form indicated at the head of the file, a single type of record being contained in a given block, while at least one block per indicator and one block per axis are provided in the information processing system.

6. A method of integration of an operational application in an information processing system used for consulting centralized information originating in operational applications, said information processing system including a server and a plurality of microcomputers that issue requests to the server, said server including data stored in the form of files and a metadictionary developed around a plurality of tables specific to documentation and administration of the information processing system, wherein said data is organized in domains, subdomains and functions, and is analyzed by a logical process contained in the metadictionary, said metadictionary including axes and indicators that describe the applications, said logical process being operable, at the moment the data to be imported into the server is defined, to create tables that contain data of complementary tables, to authorize a generic response to all requests made of the data and to optimize access performance, said method including the steps of:

identifying the system in operation or the operational base upstream, with acknowledgement of an administrator and of rights of the users;

identifying needs of the users and of types of request of the users of the system in operation;

determining domains, subdomains, axes wherein each axis includes axis levels representing a size of information the users wishes to analyze, indicators which give a measure of the size, and rules of consolidation; and preparing the server, including
generating receiving tables of addressees of upstream data of the system in operation;
updating the metadictionary relative to the rights of the users and to the definition of the axes and indicators; and
constructing consolidation tables using predefined rules of consolidation.

* * * * *